Figure 1:
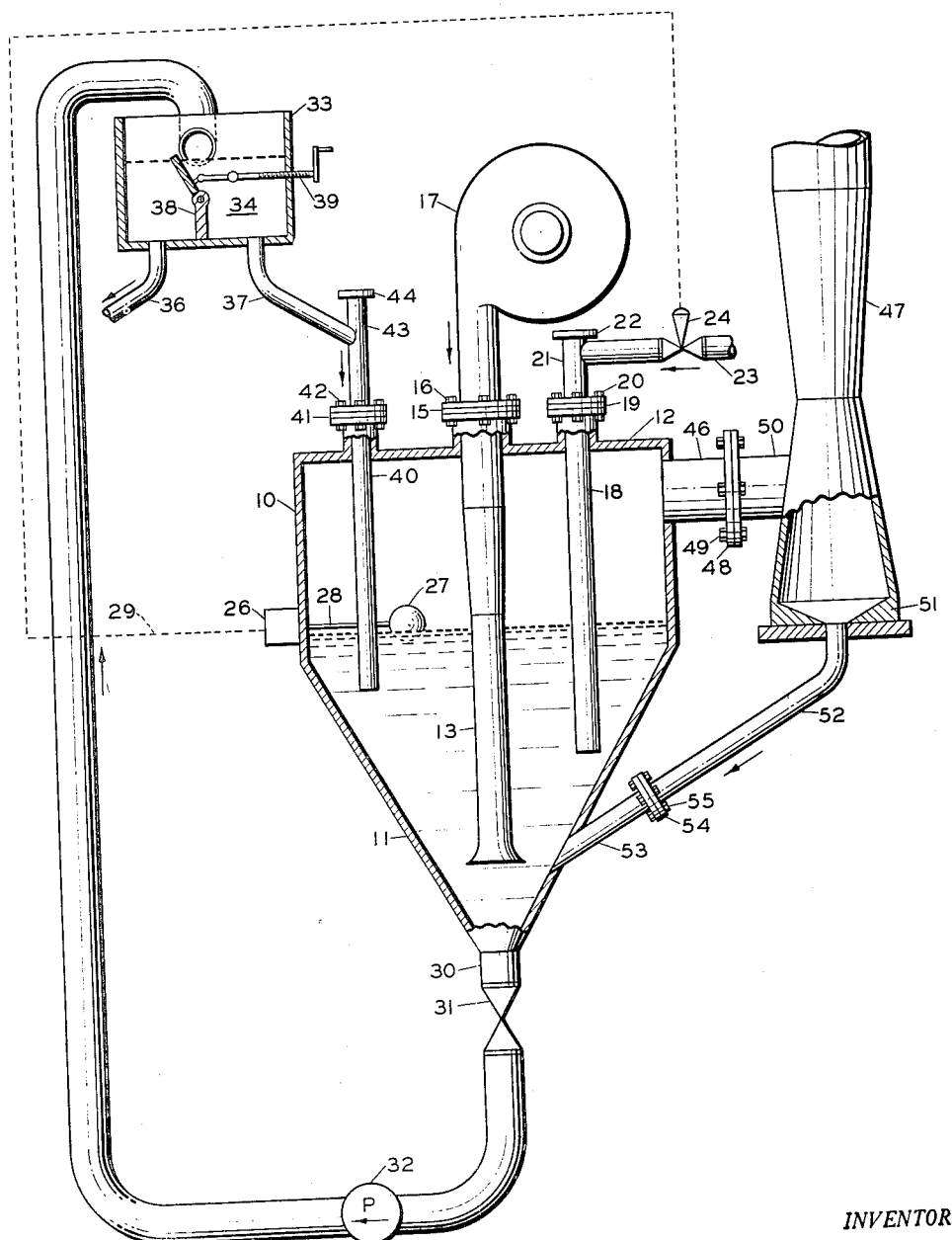

Patented Oct. 14, 1952

2,614,035

UNITED STATES PATENT OFFICE 2,614,035

EVAPORATIVE CRYSTALLIZATION PROCESS AND APPARATUS THEREFOR

Sam P. Robinson, Bartlesville, Okla., assignor to Phillips Petroleum Company, a corporation of Delaware Application January 4, 1949, Serial No. 69,197

7 Claims. (Cl. 23—302)

This invention relates to a process and apparatus for the manufacture of crystals. In one of its more specific aspects it relates to the manufacture of crystalline materials utilizing a cone-bottomed evaporative crystallizer. In a preferred embodiment this invention relates to a process and apparatus for obtaining maximum crystal growth.

An object of this invention is to provide an apparatus for the manufacture of crystalline materials.

Another object is to provide a simple, cheap, easily built apparatus for the manufacture of crystals.

Another object is to provide an apparatus for the manufacture of crystalline ammonium sulfate and the like of improved shape and size.

Still another object is to provide an improved process for the manufacture of crystalline materials.

Another object is to provide a rapid and economical process for the manufacture of crystalline materials whereby more positive control over crystal size and shape is obtained.

Another object is to provide an improved process for the manufacture of crystalline ammonium sulfate and the like.

Other objects and advantages of this invention will be apparent to one skilled in the art from the accompanying disclosure and discussion.

I have invented an improved cone-bottomed evaporative crystallizer, and also an improved process of crystallization which may, if desired, be effected in the said apparatus. More specifically, I have invented an evaporative crystallizer and process wherein a saturated solution from which crystals are to be formed is evaporated and cooled by the flow of a gas, such as air or gas inert to the process, which will remove water and whereby crystals formed are classified and a magma containing only the largest crystals is removed for crystal recovery.

The apparatus of a preferred embodiment of my invention comprises a vertical cylindrical metal shell closed at either end. The lower end or bottom of the apparatus is in the form substantially that of an inverted cone, however, the walls of the cone may be somewhat convex or concave. Axially positioned and supported by the top of the shell is a hollow conduit which extends down into the apparatus, the lower open end of which extends below the liquid level maintained therein and close to the apex of the cone. Attached to the upper end of this hollow conduit is a turbo-blower or other means for providing a forced draft through said conduit and through a solution within the apparatus. An inlet means is provided to the apparatus for introducing a solution to be evaporated. This may generally consist of a pipe, the outlet of which extends into the portion of the evaporator occupied by liquid. It is generally preferred to have the mouth of this inlet slightly above that of the air conduit to avoid disrupting the action of the air hereinafter described. Preferably this inlet extends through the top of the apparatus, but may extend through the side or through the cone-shaped bottom. The important feature is that the mouth of the inlet is below the liquid level in the apparatus and above the mouth of the air inlet.

A withdrawal conduit is provided at the bottom of the apparatus, that is, at the apex of the cone, for removing a crystal slurry, or as it is known in the art, crystal magma. This magma may be removed by such means as a diaphragm pump or other suitable pumping means. The use of the diaphragm pump is preferable because it does not break the crystals. A dividing apparatus or flow control device such as a partitioning weir box is utilized for regulating the volume and rate of magma withdrawal. This device also controls the flow of magma to a suitable crystal recovery apparatus. A conduit is provided connecting this device to an inlet into the evaporative crystallizer. Said inlet may preferably be a vertical conduit extending through the top of the crystallizer, the mouth of which conduit extends below the liquid level. Here again the primary requirement is that the mouth of the inlet be within the solution in the apparatus, and also slightly above the solution inlet. Thus the conduit may enter the apparatus through the side or through the cone bottom, providing the mouth opens within the specified area.

A conduit is provided in the portion of the evaporative crystallizer above the level of the liquid therein for exhausting gases, usually air, therefrom. Said conduit is attached to a stack for passing the gas or gases to the atmosphere. A drain is provided in the bottom of said stack for collecting and removing any entrained salt solution. A conduit from said drain communicates with the crystallizer and is preferably so placed that any liquid passed therethrough will pass directly to the solution within said crystallizer.

The boiling point saturation limit, which phrase is used in this specification, refers to the temperature at which an aqueous salt solution boils when it will no longer dissolve more of the salt without the formation of crystals. At any particular pressure this temperature is fixed for a particular salt. The determination of the boiling point saturation limit for any particular aqueous salt solution is well within the skill of the art.

Process wise, a saturated solution of a salt is introduced to the evaporative crystallizer of my invention at a temperature in the range of 25 to 1° F. below the boiling point saturation limit thereof. Sufficient solution is introduced to raise the level of the liquid to the desired point. Air or other gas is then passed through the solution and in this manner causes cooling and evaporation of the salt solution. The cooling and evaporation causes the solution to become supersaturated and then causes crystal formation. Usually it is desired to cool the solution to a temperature in the range of 140 to 160° F. preferably 145 to 150° F when treating aqueous solutions. At this temperature air, which may be substantially saturated at room temperature, will remove as much as 11 times as much moisture as it will normally carry. Therefore it is a matter of economics not to cool the solution too much because of the increasing quantity of air required to remove the water. The whole solution within the crystallizer is maintained in a turbulent state by the passage of air therethrough. Classification of the crystals, that is, separation of the large and small ones, is also caused by the turbulent condition of the solution, the small crystals being carried to the top where they can continually grow by contact with the solution, and the large crystals going to the bottom. The size of the crystals settling to the bottom of the crystallizer, that is, accumulating in the cone-bottom thereof, will depend on the rate at which the gas is passed through the solution. At a high flow rate the crystals will be forced to the top of the solution until they have become quite large, while at a low flow rate they will settle to the bottom before they have become nearly so large.

A crystal magma, i. e., a slurry of salt solution and crystals, is withdrawn from the apex of the cone shaped bottom of the crystallizer. This magma is passed to a dividing and controlling means such as a weir box flow partitioner which controls the amount of magma which is recycled back to the crystallizer and the amount of magma passed to crystal recovery apparatus. It is usually desirable to recycle 1 to 5 volumes of magma per volume passed to the recovery means. This is because a high flow rate must be maintained to keep crystal formation on the apparatus at a minimum. At low flow rates crystal formation in the magma outlet and around the mouth of the air inlet will become excessive, however, at high flow rate this crystal formation is negligible.

The gas which is used to cool the solution and evaporate the solvent is removed through an outlet to a stack where it is vented to the atmosphere. Certain amounts of salt solution are entrained in the gas and are released in the stack where the rate of flow of the gas is reduced. This salt solution is returned to the crystallizer.

My process and apparatus are particularly useful in the crystallization of aqueous ammonium sulfate solutions. My copending application Serial No. 69,196, filed January 4, 1949, now Patent No. 2,516,420, issued July 25, 1950, shows one method for utilizing evaporative crystallizer and how the prepared magma may be further treated for recovery of particularly desirable ammonium sulfate crystals.

A further understanding of some of the many aspects of my invention may be had by referring to the accompanying drawings, in conjunction with the following discussion.

Figure 2:
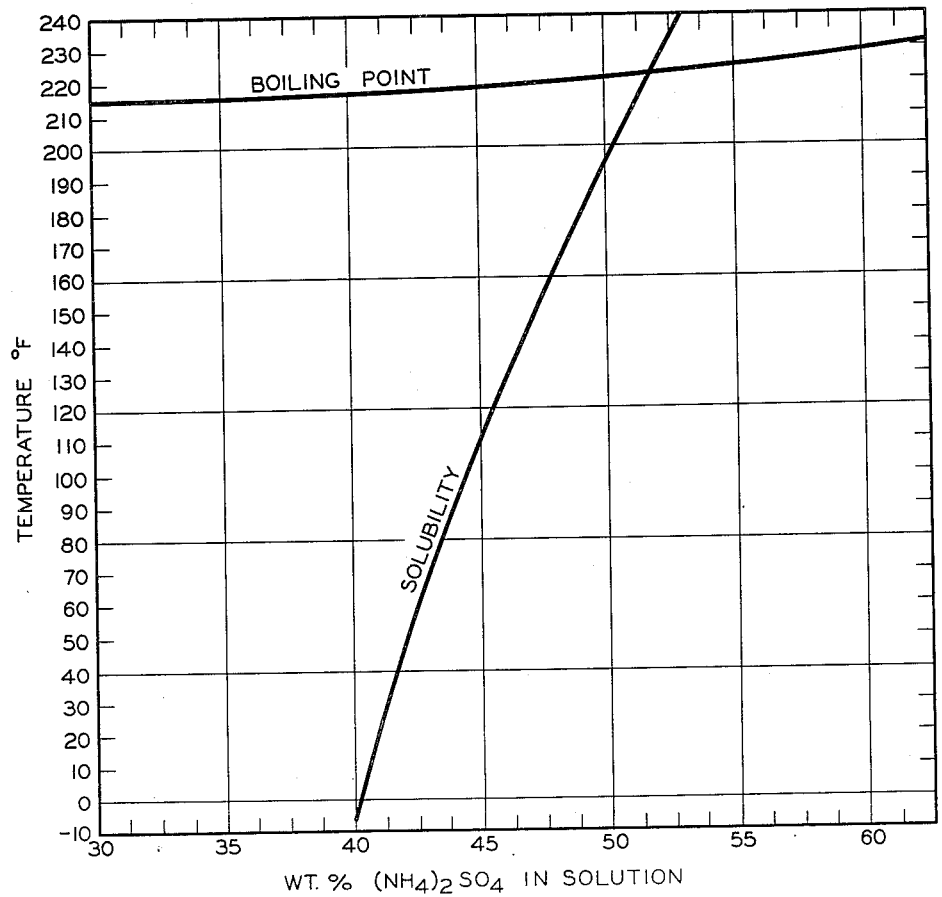

Refer now to the drawings. Figure 1 is a side elevation partly in cross section of a preferred embodiment of my invention. Figure 2 is a chart showing the boiling point saturation limit of an aqueous ammonium sulfate solution.

Refer now to Figure 1. Number 10 indicates a vertical cylindrical shell. Number 11 indicates an inverted cone shaped bottom closure member for said shell. Number 12 indicates a top closure member to said shell. Number 13 is an axially positioned conduit for air or other inert gas extending through said top closure member and within the area encompassed by said cone shaped bottom closure member and below the liquid level to be maintained within the evaporative crystallizer. The bottom of conduit 13 is preferably flared at the open lower end to allow more free passage of gas therefrom. Conduit 13 is attached to the top of said shell and held rigidly by means of flanges 15 and bolts 16. Turbo-blower 17 for passing air through conduit 13 is fastened to said conduit by flanges 15 and bolts 16 also.

Number 18 indicates a vertically positioned hollow conduit for introducing ammonium sulfate or other solution to be evaporated into shell 10. This conduit extends through top closure member 12 into said shell and below the liquid level of material therein. Said conduit is supported in a rigid manner by flanges 19 and bolts 20. Attached to conduit 18 is a vertical tube 21 the top of which is covered by a removable closure member 22. This removable closure member is to facilitate cleaning of the conduit such as removing any excess crystal growth which may take place therein. Conduit 23 containing motor valve 24 leads from liquid storage tanks and heaters not shown and provides a means for introducing a solution to be evaporated to conduit 21 and therefrom via conduit 18 into the evaporative crystallizer. Number 26 indicates a liquid level controller. Float 27 attached to lever arm 28 actuates the controller as the liquid level within the evaporative crystallizer changes. This controller in turn actuates motor valve 24 previously mentioned in the feed stream conduit to which it is connected by means of line 29 thus controlling the flow of solution into the crystallizer and thereby the level of liquid therein.

Number 30 indicates a conduit for withdrawing a crystal slurry or magma from the apex of bottom closure member 12. Number 31 indicates a manually operated positive shut off valve. Number 32 indicates a diaphragm pump for passing the crystal slurry through conduit 30. The crystal slurry from conduit 30 is passed to partitioning weir box 33, the top of which may be open or covered by an easily removable cover to enable visual inspection or sampling of the crystal slurry passing therethrough. Number 34 indicates a vertical weir over which the slurry introduced to the weir box on one side must pass to reach outlets 36 and 37 in the bottom of the box and on the other side. Number 38 indicates a hinged partition at right angles to weir 34. Number 39 is a means comprising a hand screw attached to partition 38 for adjusting the position of the top and movable portion thereof. By so adjusting the top portion of partition 38 the flow of material passing over weir 34 may be divided as desired. It is often desirable to have the weir box above the liquid level in the crystallizer so that the recycled slurry may be passed thereto by gravity. Slurry to be further evaporated or dried is removed from the bottom of weir box 33 via conduit 36. Recycle slurry is removed via conduit 37. Number 40 is a vertical conduit extending through top closure member 12 of the evaporative crystallizer and below the liquid level maintained therein and is rigidly supported by means of flanges 41 and bolts 42. Attached to conduit 40 and conduit 37 is vertical conduit 43 which is fastened to conduit 40 also by means of flanges 41 and bolts 42. Conduit 37 is attached to the side of conduit 43). The top of conduit 43 is closed by a removable member 44. This member is made removable similar to member 22 to facilitate cleaning conduits 43 and 40 of excessive crystal growth and the like.

Horizontal conduit number 46 leads from the side of shell 10 above the liquid level of material therein. This conduit is supplied to remove gas introduced to the evaporative crystallizer via conduit 13. Conduit 46 is attached to stack 47 by means of flanges 48, bolts 49 and conduit 50. Stack 47 is provided with an inverted cone shaped bottom closure member 51 utilized to collect any solution entrained in the exhausted gas. Liquid collected in the bottom of stack 47 is removed therefrom, by conduit 52 which is attached to conduit 53 by flanges 54 and bolts 55, and passed back to the evaporative crystallizer 11 below the liquid level therein.

Refer now to Figure 2 which is a chart showing the boiling point saturation limit for one particular material which may be evaporated in my apparatus, aqueous ammonium sulfate. The abscissa indicates the weight per cent of ammonium sulfate dissolved in water. The ordinate indicates temperature. As more ammonium sulfate is added to the solution, the boiling point is raised. The point at which the two curves cross indicates the maximum quantity of ammonium sulfate which may be dissolved at atmospheric pressure and the temperature at which this solution boils. In other words, no more ammonium sulfate may be dissolved in the solution without crystal formation, and the boiling point temperature will not go any higher.

The following example will show how my apparatus may be used to best advantage. The proportions of materials are presented as being typical and should not be construed as limiting the invention unduly.

*Example*

A concentrated ammonium sulfate solution boiling at 205° F. which is below the boiling point saturation limit, without any crystals present, is fed to an evaporative crystallizer of the present invention. Twenty-five cubic feet per minute of 80° F–50% relative humidity cooling air is introduced into the hot solution and the solution cooled to 150° F. At this temperature 8.8 pounds of crystals are recovered per 100 pounds of feed liquor.

If the solution is cooled to 145° F by the air 30 cubic feet of air per minute will be needed, however, 10.2 pounds of crystals are obtained.

If the solution is cooled to 120° F. 72 cubic feet of air per minute are required but 12.7 pounds of crystals are obtained.

Thus it may be seen that an optimum temperature below which the solution should not be cooled is between 145 and 120° F. Generally this temperature will be about 145° F.

If the same solution is cooled to 120° F. without evaporation and the passage of air therethrough to provide agitation and evaporation, 9.8 pounds of crystals will be obtained. However, this type of operation is not satisfactory because the crystals will cake and grow together and thus cause tremendous handling difficulties.

Although this apparatus and process for operating same have been described in terms of their preferred modifications, it is understod that various changes may be made without departing from the spirit and scope of the disclosure and of the claims.

I claim:

1. An improved process for the manufacture of crystals which comprises introducing a hot saturated feed solution at a temperature in the range of 25° to 1° F. below its boiling point saturation limit to a cone bottomed evaporative crystallization zone; introducing a stream of gas to said solution at a sufficient rate to pass therethrough and thereby cause evaporation, cooling, crystallization, turbulence of said solution, and classification of crystals; removing said gas from said evaporative crystallization zone, removing a crystal magma from the bottom of said evaporative crystallization zone containing the largest of said crystals; passing at least a portion of said magma back to said evaporative crystallization zone; and passing the remaining portion of said magma to a crystal recovery zone.

2. An improved process for the manufacture of crystals which comprises introducing a hot saturated feed solution at a temperature in the range of 25° to 1° F. below its boiling point saturation limit to a cone bottomed evaporative crystallization zone; introducing a stream of gas to said solution at a sufficient rate to pass therethrough and thereby cause evaporation, cooling to a temperature in the range of 140 to 160° F., crystallization, turbulence of said solution, and classification of crystals; removing said gas from said evaporative crystallization zone, removing a crystal magma from the bottom of said evaporative crystallization zone containing the largest of said crystals; passing at least a portion of said magma back to said evaporative crystallization zone; and passing the remaining portion of said magma to a crystal recovery zone.

3. An improved process for the manufacture of crystals which comprises introducing a hot saturated salt feed solution at a temperature in the range of 5° to 1° F. below its boiling point saturation limit to a cone bottomed evaporative crystallization zone; introducing a stream of gas to said solution at a sufficient rate to pass therethrough and to cause cooling to a temperature in the range of 145 to 150° F., evaporation, crystallization, turbulence of said solution, and classification of crystals; removing said gas from said evaporative crystallization to a separation zone wherein entrained solution is removed; returning said solution to said zone; removing a crystal magma containing the largest classified crystals from the bottom of said evaporative crystallization zone; passing said magma to a dividing zone, passing a portion of said magma to a crystal recovery zone; recycling the remaining magma in a ratio of 1:1 to 5:1 volumes per volume of magma passed to said crystal recovery zone; and recycling mother liquor removed from said crystals in said crystal recovery zone.

4. A process according to claim 3 wherein said saturated solution is a saturated ammonium sulfate solution.

5. A process according to claim 3 wherein said gas passed through said solution is air.

6. An evaporative crystallizing apparatus which comprises a crystallizer comprising a vertical cylindrical top section closed at the top, and an inverted cone-shaped closed bottom section the apex of said cone being in axial alignment with the axis of said cylindrical top section, a hollow gas conduit supported by the cylindrical top section and extended axially into the lower conical section, being axially positioned so that its lower open end extends in close proximity to the apex of said inverted cone which forms the bottom section of said crystallizer, a forced gas blower attached to said axially positioned conduit at its upper end outside of the crystallizer, a liquid level controller for maintaining a constant liquid level within the cylindrical top section, for introducing solution to be evaporated a feed stream conduit extended so that its mouth is below the intended liquid level but above the level of the mouth of the axially positioned inert gas conduit, a motor valve in said feed stream conduit actuated by the liquid level controller, a magma withdrawal outlet at the apex of the inverted cone forming the bottom section, a flow control device in connection with said magma withdrawal outlet for controlling the rate of magma withdrawal said flow control device being adapted to divide the flow of magma so that part of the magma can be withdrawn while part of the magma is recycled to the crystallizer, a recycle conduit connected to the magma flow controller and extended into the crystallizer below the intended liquid level but above the level of the mouth of the feed stream conduit which introduces solution to be evaporated, and an outlet in the upper cylindrical section of said crystallizer above the intended liquid level for exhausting gases.

7. An evaporative crystallizing apparatus which comprises a crystallizer comprising a vertical cylindrical top section closed at the top, and an inverted cone-shaped closed bottom section the apex of said cone being in axial alignment with the axis of said cylindrical top section, a hollow air conduit supported by the cylindrical top section and extended axially into the lower conical section, being axially positioned so that its lower open end which is flared extends in close proximity to the apex of said inverted cone which forms the bottom section of said crystallizer, a turbo-blower attached to said axially positioned conduit at its upper end outside of the crystallizer, a liquid level controller actuated by a float within the crystallizer for maintaining a constant liquid level within the cylindrical top section, for introducing solution to be evaporated a feed stream conduit extended so that its mouth is below the intended liquid level but above the level of the mouth of the axially positioned inert gas conduit, a motor valve in said feed stream conduit actuated by the liquid level controller, a magma withdrawal outlet at the apex of the inverted cone forming the bottom section, a valve in said outlet for controlling the rate of magma withdrawal, a partitioning weir box in connection with said withdrawal outlet for dividing the flow of magma so that part of the magma can be withdrawn while part of the magma is recycled to the crystallizer, a recycle conduit connected to said weir box and extended into the crystallizer below the intended liquid level but above the level of the mouth of the feed stream conduit which introduces solution to be evaporated, an outlet in the upper cylindrical section of said crystallizer above the intended liquid level for exhausting gases, a stack attached to said outlet, and a hollow conduit leading from the bottom of said stack into the bottom section of the crystallizer below the liquid level.

SAM P. ROBINSON.

REFERENCES CITED

The following references are of record in the file of this patent:

UNITED STATES PATENTS

| Number | Name | Date |
|---|---|---|
| 2,037,595 | Schafer | Apr. 14, 1936 |
| 2,348,328 | Chapman et al. | May 9, 1944 |
| 2,404,790 | Otto | Oct. 22, 1946 |